(12) United States Patent
Stefura et al.

(10) Patent No.: US 10,486,588 B2
(45) Date of Patent: Nov. 26, 2019

(54) LIGHTING MODULE FOR AUTOMOTIVE VEHICLE

(71) Applicant: VALEO VISION, Bobigny (FR)

(72) Inventors: Eric Stefura, Bobigny (FR); Thierry Fleurence, Bobigny (FR); Laurent Liard, Bobigny (FR); Nirina Rasoldier, Bobigny (FR); Kaoutar Ezzouaq, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/903,292

(22) Filed: Feb. 23, 2018

(65) Prior Publication Data

US 2018/0236934 A1 Aug. 23, 2018

(30) Foreign Application Priority Data

Feb. 23, 2017 (FR) ...................................... 17 51444

(51) Int. Cl.
*B60Q 3/217* (2017.01)
*B60Q 3/80* (2017.01)
(Continued)

(52) U.S. Cl.
CPC ............... *B60Q 3/217* (2017.02); *B60Q 3/62* (2017.02); *B60Q 3/80* (2017.02); *F21S 43/235* (2018.01); *G02B 6/0006* (2013.01); *G02B 6/423* (2013.01); *G02B 6/4244* (2013.01); *G02B 6/4298* (2013.01); *G02B 6/4242* (2013.01)

(58) Field of Classification Search
CPC .... G02B 6/0006; G02B 6/423; G02B 6/0001; G02B 6/001; G02B 6/4292; G02B 6/0091; G02B 6/24; G02B 6/36; G02B 6/42
See application file for complete search history.

(56) References Cited

U.S. PATENT DOCUMENTS 4,760,218 A * 7/1988 Gutman ................. H01H 13/72
200/17 R
6,821,027 B2 * 11/2004 Lee ...................... G02B 6/4249
385/89

(Continued)

FOREIGN PATENT DOCUMENTS

DE 10 2015 214 364 A1 2/2017
EP 1 522 459 A2 4/2005

OTHER PUBLICATIONS

French Preliminary Search Report dated Oct. 19, 2017 in French Application 17 51444 filed on Feb. 23, 2017 (with English Translation of Categories of Cited Documents).

*Primary Examiner* — Christopher Stanford
(74) *Attorney, Agent, or Firm* — Oblon, McClelland, Maier & Neustadt, L.L.P.

(57) ABSTRACT

The invention concerns a lighting module for a motor vehicle including a bearing plate, a light source arranged on the bearing plate, a driver module for the light source arranged on the bearing plate, a light guide designed to cooperate with the light source, a reception casing for the light guide that is rigidly connected to the bearing plate including a first opening that is designed to receive the light guide, at least one aperture that is designed to receive an anchoring tab of a locking part, the locking part including a main body, at least one anchoring tab projecting from the main body that is designed to lock the light guide in the reception casing.

19 Claims, 4 Drawing Sheets

Figure 1:
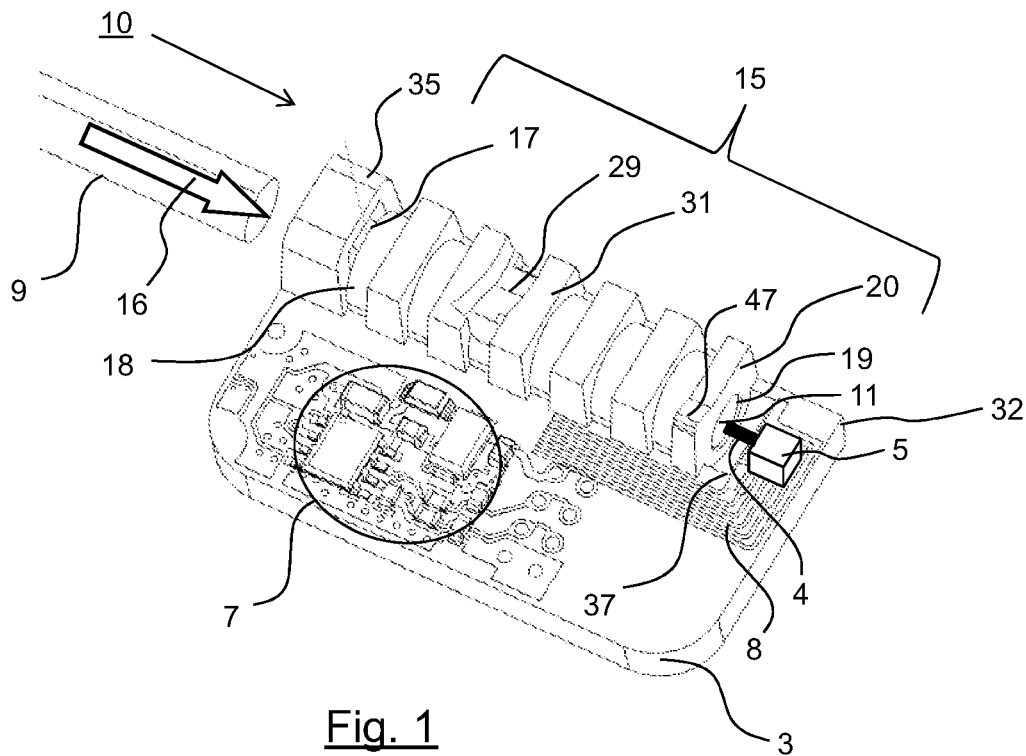

(51) Int. Cl.
   *B60Q 3/62*   (2017.01)
   *G02B 6/42*   (2006.01)
   *F21S 43/235*   (2018.01)
   *F21V 8/00*   (2006.01)

(56) References Cited

U.S. PATENT DOCUMENTS

| | | | | |
|---|---|---|---|---|
| 6,883,949 B2* | 4/2005 | Goto | ................... | G02B 6/0006 362/476 |
| 7,114,857 B1* | 10/2006 | Kayner | ................ | G02B 6/4246 385/88 |
| 8,794,809 B2* | 8/2014 | Lundin | ................ | G02B 6/0006 362/551 |
| 8,807,806 B2* | 8/2014 | Hayashi | .................. | B60Q 3/64 362/296.01 |
| 9,179,029 B2* | 11/2015 | Kim | .................. | H04N 1/02815 |
| 9,840,195 B2* | 12/2017 | Inose | ....................... | B60Q 3/51 |
| 2005/0270794 A1* | 12/2005 | Okamoto | ................ | F21V 5/008 362/555 |
| 2012/0113660 A1* | 5/2012 | Ishikawa | .............. | B60Q 1/0088 362/494 |
| 2012/0262937 A1* | 10/2012 | Hayashi | ................... | B60Q 3/64 362/520 |
| 2013/0094233 A1* | 4/2013 | Ukai | ....................... | B60Q 3/51 362/511 |
| 2013/0108224 A1* | 5/2013 | Ishigami | .............. | G02B 6/4249 385/89 |
| 2014/0092601 A1* | 4/2014 | Orisich | ................ | G02B 6/0081 362/294 |
| 2014/0294340 A1* | 10/2014 | Yasuda | ................. | G02B 6/428 385/14 |
| 2015/0146433 A1* | 5/2015 | Suzuki | .................... | B60Q 3/80 362/311.01 |
| 2015/0316711 A1* | 11/2015 | North | ................... | G02B 6/0096 362/551 |
| 2015/0345765 A1* | 12/2015 | Horst | .................... | F21V 31/005 362/362 |
| 2017/0023749 A1* | 1/2017 | Douma | ................... | G02B 6/423 |
| 2017/0363267 A1* | 12/2017 | Maitre | ................ | G02B 6/0006 |

* cited by examiner

LIGHTING MODULE FOR AUTOMOTIVE VEHICLE

TECHNICAL FIELD OF THE INVENTION

The present invention concerns a lighting module for a motor vehicle and an assembly method for assembling a light guide of said lighting module on a bearing plate for said lighting module.

TECHNOLOGICAL BACKGROUND TO THE INVENTION

In a manner known to a person skilled in the art, a lighting module for a motor vehicle includes:
  a printed circuit board,
  a light source arranged on said printed circuit board,
  a driver module for said light source arranged on said printed circuit board,
  a light guide designed to cooperate with said light source.

The printed circuit board and the components carried thereon (light source, light guide, etc.) is arranged in a housing that protects the printed circuit board from dust.

Such lighting modules are used in a non-limiting example for a passenger compartment of a motor vehicle, for example for the interior lighting of the doors.

Thus, the light guide is designed to carry visible radiation generated by the light source in order to illuminate a portion of the passenger compartment of the motor vehicle. One of the ends of the light guide has matching shapes that enable the light guide to be attached to said housing such as to face the light source.

One drawback of this prior art is that, in order to make the light guide, an additional process is required to make these matching shapes, either by injection or extrusion.

In this context, the present invention is intended to address the aforementioned drawback.

GENERAL DESCRIPTION OF THE INVENTION

For this purpose, the invention proposes a lighting module for a motor vehicle, said lighting module including:
  a bearing plate,
  a light source arranged on said bearing plate,
  a driver module for said light source arranged on said bearing plate,
  a light guide designed to cooperate with said light source,
  a reception casing for said light guide that is rigidly connected to said bearing plate comprising:
    a first opening that is designed to receive said light guide,
    at least one aperture that is designed to receive an anchoring tab of a locking part,
  said locking part comprising:
    a main body,
    at least one anchoring tab projecting from the main body that is designed to lock the light guide in said reception casing.

Thus, as explained in detail below, the reception casing ensures that the light guide is properly positioned in relation to the light source for optimum operation of the lighting module, and the locking part immobilizes the light guide in the reception casing. The light guide no longer requires matching shapes to be attached. This simplifies manufacture of the light guide.

According to non-limiting embodiments, the lighting module can also have one or more of the following additional characteristics:

According to one non-limiting embodiment, the reception casing has a second opening through which the light guide opens such as to face said light source.

According to one non-limiting embodiment, said lighting module also has an arch bracket arranged on said bearing plate upstream of the reception casing that is designed to act as support for said locking part.

According to one non-limiting embodiment, the locking part also has a support lug that is designed to be inserted in said arch bracket.

According to one non-limiting embodiment, the reception casing also has a shoulder that is designed to stop the light guide.

According to one non-limiting embodiment, the locking part has two anchoring tabs that are arranged to face one another in the main body.

According to one non-limiting embodiment, said at least one anchoring tab is elastically deformable.

According to one non-limiting embodiment, the reception casing also has a plurality of ribs.

According to one non-limiting embodiment, the bearing plate and the reception casing are made of a plastic material.

According to one non-limiting embodiment, the locking part is a metal part.

According to one non-limiting embodiment, the main body of the locking part includes:
  a main wall designed to butt against the bearing plate, and
  two secondary walls that are arranged on either side of the main wall and designed to frame said bearing plate.

According to one non-limiting embodiment, the two secondary walls of the main body are convergent.

According to one non-limiting embodiment, the two secondary walls extend on either side of the main wall such as to cover all or some of said bearing plate.

According to one non-limiting embodiment, the secondary walls have beveled ends.

According to one non-limiting embodiment, the section of the main body is substantially U-shaped or square.

According to one non-limiting embodiment:
  said main body of said locking part has an orifice, and
  said reception casing has a locking stop that is designed to fit into said orifice.

According to one non-limiting embodiment, the light source is a semi-conductor emitter chip.

An assembly method for assembling a light guide of a lighting module for a motor vehicle on a bearing plate is also proposed, said assembly method comprising:
  inserting a portion of a locking part into a reception casing of said light guide by means of a translational movement, said reception casing being rigidly connected to said bearing plate,
  rotating said locking part towards said bearing plate.

According to one non-limiting embodiment,
  said translational insertion includes the insertion of a lug of said locking part into an arch bracket of said lighting module,
  said rotation includes the rotation about a sliding axis perpendicular to said bearing plate such that a main body of said locking part butts against said bearing plate.

According to one non-limiting embodiment, said assembly method also includes locking said light guide in said reception casing using a locking stop of said reception casing that is designed to fit into an orifice of said locking part.

According to one non-limiting embodiment, the lighting module is designed for a passenger compartment of a motor vehicle.

SHORT DESCRIPTION OF THE FIGURES

The invention and the different applications thereof can be better understood from the description below and the accompanying figures.

Figure 2:
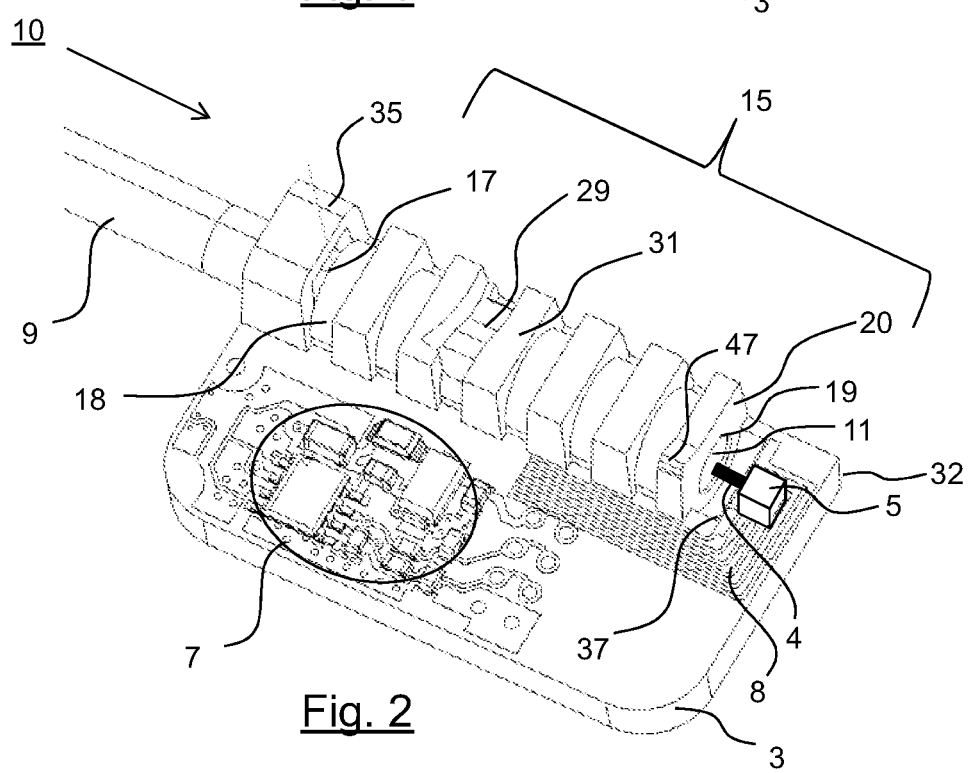
Figure 3:
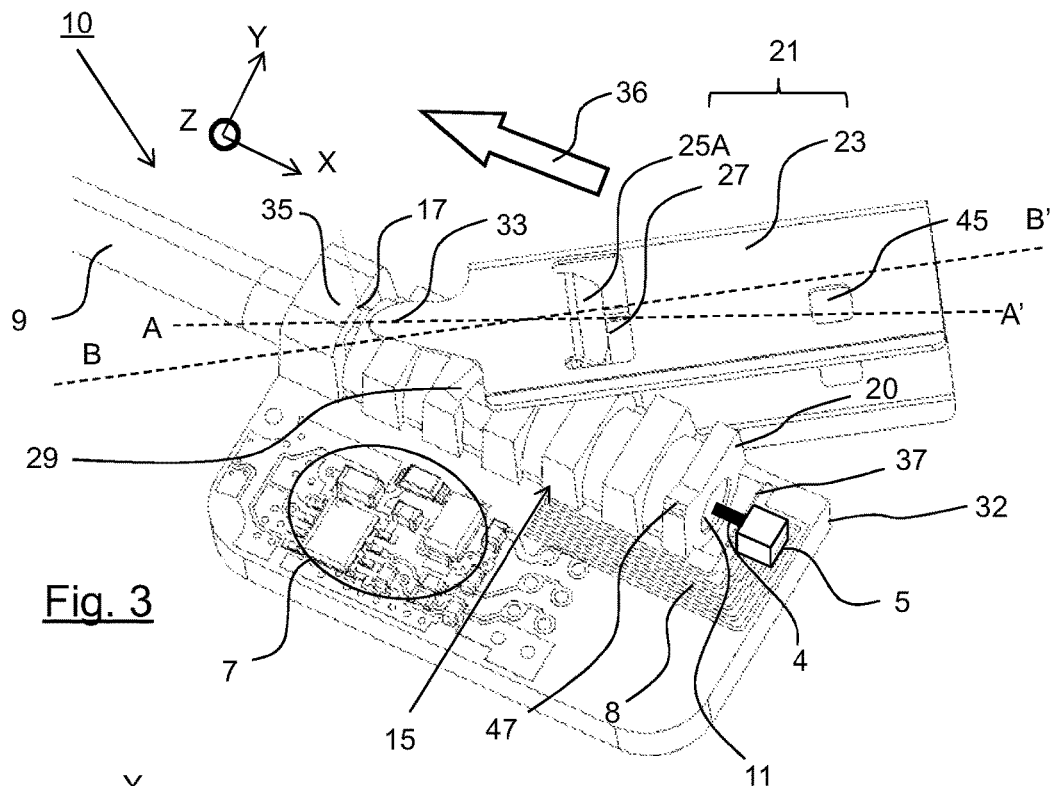
Figure 4:
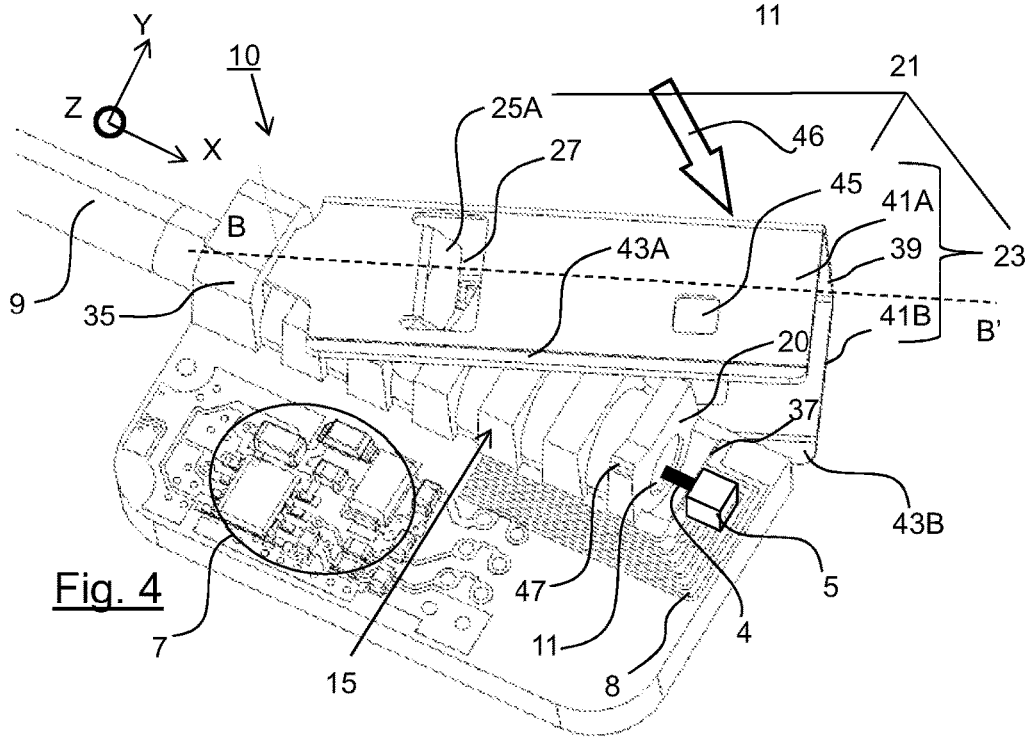
Figure 5:
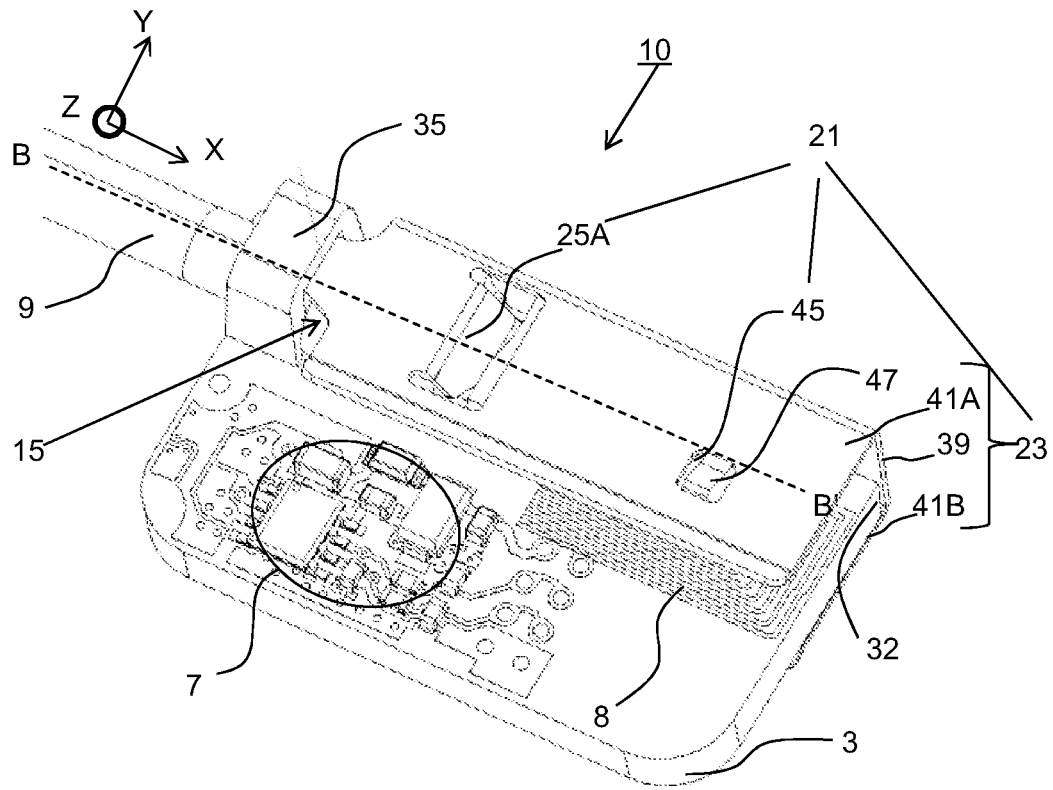
Figure 6:
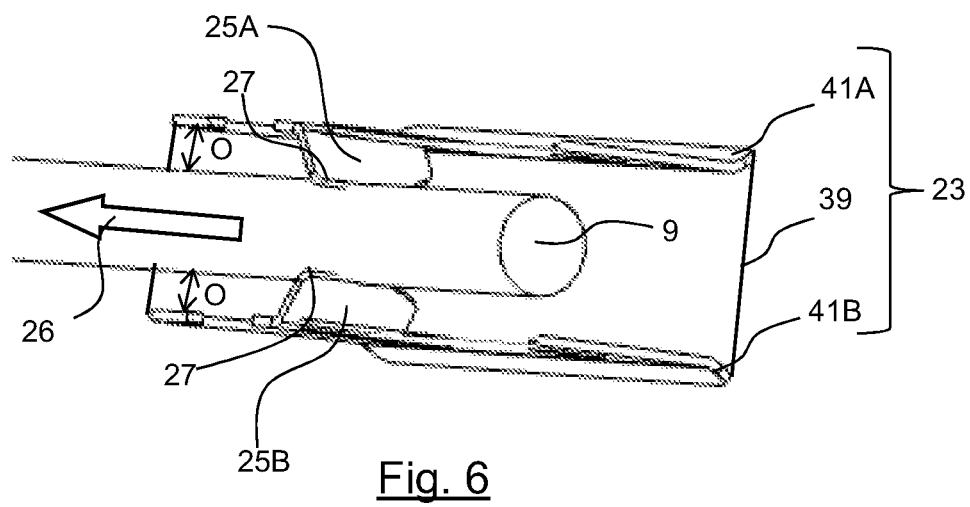
Figure 7:
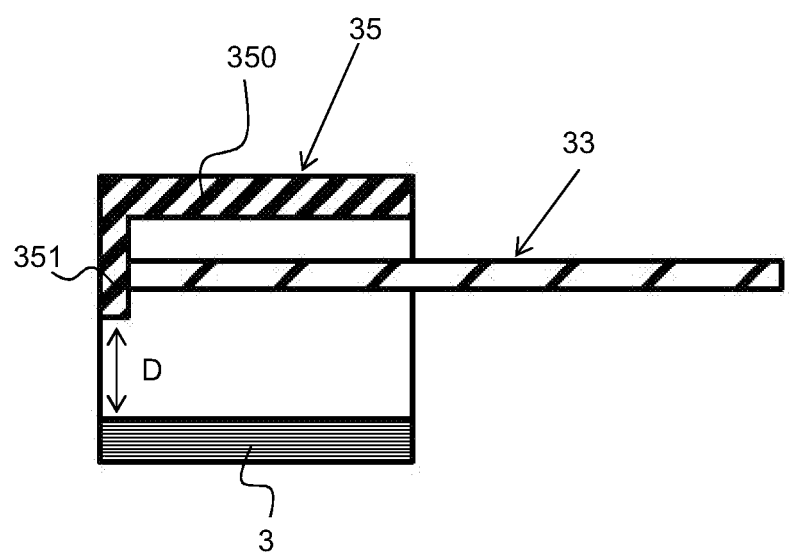

FIG. 1 is a schematic view of a lighting module according to one non-limiting embodiment of the invention, in which a light guide is inserted into a reception casing of said lighting module, FIG. 2 is a schematic view of the lighting module in FIG. 1 in which the light guide is positioned in the reception casing facing the light source, FIG. 3 is a schematic view of the lighting module in figure one in which a portion of a locking part is inserted by means of a translational movement into the reception casing of said lighting module, FIG. 4 is a schematic view of the lighting module in FIG. 3 in which the locking part is rotated towards a bearing plate of said lighting module, FIG. 5 is a schematic view of the lighting module in FIG. 4 in which the light guide is locked in the reception casing by the locking part, FIG. 6 is a simplified perspective view of a portion of the lighting module in FIG. 5 showing the light guide locked by the support lugs of the locking part, and FIG. 7 is a transverse cross section of an arch bracket of the lighting module in FIG. 5, said arch bracket cooperating with a support lug of the locking part.

DESCRIPTION OF EMBODIMENTS OF THE INVENTION

Unless otherwise specified, elements that are identical in structure or function and that appear in multiple figures are indicated using the same reference signs.

The lighting module 10 for a motor vehicle according to the invention is described with reference to FIGS. 1 to 7.

Motor vehicle shall mean any type of motorized vehicle.

In the limiting examples, the lighting module 10 is designed to illuminate:
  the doors of the motor vehicle,
  the ceiling of the motor vehicle,
  the dashboard of the motor vehicle,
  the central console of the motor vehicle,
  a zone beneath a seat of the motor vehicle, inside or beneath the glove box or a storage tray, etc.

For this purpose, the lighting module is built into these different elements, for example into the trim of these different elements.

In one non-limiting embodiment considered in the remainder of the description, the lighting module 10 is a lighting module 10 for the passenger compartment of a motor vehicle that is used for the interior lighting of the doors of the motor vehicle.

As shown in FIGS. 1 to 5, the lighting module 10 includes:
  a bearing plate 3,
  a light source 5,
  a driver module 7 for the light source 5,
  a light guide 9 designed to cooperate with the light source 5,
  a reception casing 15 for the light guide 9,
  a locking part 21 that is designed to lock the light guide 9 in the reception casing 15.

In one non-limiting embodiment, the lighting module 10 also includes an arch bracket 35.

The different elements of the lighting module 10 are described in detail below.

Bearing Plate

The bearing plate 3 is designed to carry the other elements of the lighting module 10. In one non-limiting embodiment, the bearing plate is substantially rectangular. The bearing plate includes a plane that is parallel to an axis X. Thus, the light source 5 and the driver module 7 are arranged on said bearing plate 3. The bearing plate 3 also holds the electronic components required for the correct operation of the light source 5 and of the driver module 7. In the non-limiting example shown, all of the electronic components are thus arranged on the same face of the bearing plate. In another non-limiting example, the driver module 7 can be arranged on the other face.

The bearing plate 3 also has metal tracks 8 that are designed to provide the electrical power supply to the electronic components (light source 5, driver module 7, etc.) and to carry commands from the driver module 7 to the light source 5. In non-limiting embodiments, the metal tracks 8 are welded or glued to the bearing plate 3 or formed by laser printing or embossing, etc.

The reception casing 15 is rigidly connected to said bearing plate 3.

In one non-limiting embodiment, the bearing plate 3 is made of a plastic material. This provides a relatively light, electrically insulating part.

Light Source

The light source 5 is designed to emit visible radiation 4. This power is sufficient for the interior lighting sought after. In a non-limiting example, the power of the visible radiation 4 is equal to or less than 5 lumens. In a non-limiting example, the visible radiation totals 3 lumens.

The light source 5 has a lateral emission zone of the visible radiation 4. The emission zone can thus be arranged to face the light guide 9, in particular to face the end 11 of the light guide described below.

In a non-limiting embodiment, the light source 7 is a semi-conductor emitter chip. In a non-limiting variant embodiment, the semi-conductor emitter chip is part of a light-emitting diode. Light-emitting diode shall mean any type of light-emitting diode including, in the non-limiting examples, LEDs (Light-Emitting Diodes), OLEDs (Organic LEDs), AMOLEDs (Active-Matrix-Organic LEDs) or FOLEDs (Flexible OLEDs).

In a non-limiting embodiment, the light source 5 is monochromatic, RGB (Red, Green, Blue) or RGBW (Red, Green, Blue, White).

Driver Module

The driver module 7 is designed to send control commands to the light source 5 and to power same. In a non-limiting embodiment, the driver module 7 includes a microcontroller and/or a plurality of switches for generating these commands. In a non-limiting example, the switches are MOSFET transistors. Driver modules are known to the person skilled in the art, and as such are not described here.

The commands are sent from the driver module 7 to the light source 5 via the metal tracks 8. In a non-limiting embodiment, the metal tracks 8 are designed to cooperate with a card edge connector that has, in a manner known to the person skilled in the art, a clasp provided with contacts designed to come into contact with the metal tracks 8 of the bearing plate 3 in order to connect the latter to a power supply harness. The electrical power supply harness carries the supply voltage from an electrical power supply network such as a motor vehicle battery, and thus to power the driver module 7 via the metal tracks 8.

Light Guide

The light guide 9 is designed to carry the visible radiation generated by the light source 5. In a non-limiting embodiment, the light guide 9 is a cylinder defining a routing corridor for the light.

The light guide 9 is made of a plastic material designed to transmit and reflect the light. In non-limiting embodiments, the material is a polymer or an acrylic resin. In non-limiting variants, the material is poly(methyl methacrylate) (PMMA) or polycarbonate (PC).

Advantageously, the light guide 9 is flexible, i.e. is made of a polymer material, the glass transition temperature (Tg) of which is less than 25° C. Advantageously, the light guide 9 is made of a transparent silicone polymer or of transparent polyurethane. The light guide is then relatively more flexible than more rigid thermoplastic materials such as PMMA or PC.

The light guide 9 has an end 11 arranged to face the light source 5 such that the visible radiation 4 from said light source 5 directly enters said light guide 9 and is thus guided through the material to illuminate the inside of the doors in the non-limiting example considered. It should be noted that the light guide 9 has prisms used to reflect the visible radiation 4 inside said light guide 9. The light guide 9 is designed to be inserted into the reception casing 15 described below.

Reception Casing

The reception casing 15 is designed to receive the light guide 9.

In a non-limiting embodiment, the reception casing 15 is rigidly connected to the bearing plate 3. This then forms a single part. There is no need for a method for assembling and indexing the reception casing 15 in relation to the bearing plate 3.

In one non-limiting embodiment, the bearing plate 3 and the reception casing 15 are made of the same plastic material during a single manufacturing operation.

As shown in FIGS. 1 and 2 for example, the reception casing 15 includes:
- a first opening 17 that is designed to receive the light guide 9, and
- a second opening 19 through which the light guide 9 opens such as to face said light source 5.

The first opening 17 is found at a first end 18 of the reception casing 15. The light guide 9 is thus inserted through the first opening 17. The reception casing 15 is long enough for the light guide 9 to slide along the entire length thereof.

The second opening 19 is thus positioned at a second end 20 of the reception casing 15 opposite the first end 18 of the reception casing 15.

There is sufficient clearance O (shown in FIG. 6) between the inner walls of the reception casing 15 and the light guide 9 to facilitate insertion of the light guide 9 into the reception casing 15 as far as the light source 5.

In a non-limiting embodiment, the inside of the reception casing 15 is cylindrical and has a constant section. The inside is therefore the female shape of the light guide 9.

In a non-limiting embodiment, the reception casing 15 has at least one aperture 29 designed to receive an anchoring tab 25A, 25B belonging to the locking part 21 described below.

According to one non-limiting embodiment, the reception casing 15 also includes a plurality of ribs 31 arranged along the reception casing 15. These ribs 31 help to stiffen the reception casing 15. In a non-limiting embodiment, the ribs 31 have a substantially square profile. The ribs facilitate the manufacture of the reception casing 15 by injection. The ribs effectively prevent accumulation of an excessive mass of plastic, which could give rise to shrinkage problems when the material is removed. This saves on the injected material and reduces the volume of material. Furthermore the locking part 21 can rest on the ribs since the ribs form a plane that comes into contact with the secondary walls 41A and 41B when the locking part 21 is in the locked position.

In one non-limiting embodiment, the reception casing 15 also has a shoulder 37 that is designed to stop the light guide 9 at a given distance from the light source 5. The shoulder 37 is positioned downstream of the second end 20 of the reception casing 15.

Arch Bracket

The arch bracket 35 is arranged on said bearing plate 3 upstream of the reception casing 15 and is designed to act as support for a support lug 33 (described below) of the locking part 21.

In a non-limiting embodiment, the arch bracket 35 is closed, i.e. the arch bracket has an upper face 350 shown in FIG. 7 with no opening.

The closed arch bracket 35 thus limits the perpendicular travel point along the axis Y (perpendicular to the axis X) of the support lug 33 and prevents the locking part 21 from being released elastically.

As shown in the cross section in FIG. 7, the arch bracket 35 also has a vertical face 351 that comes into contact with the support lug 33 when the support lug is inserted into said arch bracket 35. The vertical face 351 is positioned at a distance D from the bearing plate 3, the distance D being adjusted to enable the light guide 9 to pass beneath the arch bracket 35.

Locking Part

The locking part 21 is designed to lock the light guide 9 in the reception casing 15.

The locking part 21 is moveable in relation to the reception casing 15 between an unlocked position and a locked position. In the unlocked position, the light guide 9 can move freely in the reception casing 15. In the locked position, the light guide 9 is locked in the reception casing and can no longer move.

As shown in FIGS. 3 to 6, the locking part 21 includes the following:
- a main body 23,
- at least one anchoring tab 25A, 25B projecting from the main body 23 that is designed to lock the light guide 9 in said reception casing 15.

In one non-limiting embodiment, the locking part 21 is a metal part. The locking part 21 is stronger than an equivalent plastic part. This reduces the risk of the locking part breaking. Indeed, this provides the locking part with greater elasticity for maintaining friction between the support lug 33 (described below) and the light guide 9.

In a non-limiting embodiment shown in FIG. 3, the locking part 21 also includes a support lug 33 that is designed to be inserted into the arch bracket 35 of the lighting module 10. The support lug 33 extends the main body 23. The support lug is designed into be inserted in the arch bracket 35 and to butt against the arch bracket 35, in particular against the face 350 thereof. Thus, the locking part 21 is a removable part that can be easily assembled using the support lug 33. As shown, the support lug 33 lies along an axis AA' (shown in FIG. 3) that is slightly inclined in relation to the longitudinal axis BB' (shown in FIG. 3) of the locking part 21. This facilitates insertion of the support lug 33 into the arch bracket 35. The support lug 33 has a rounded end that is designed to be in contact with the face 350 of the arch bracket 35. The contact, referred to as linear contact, between the rounded end and the face 350 of the arch bracket 35 forms a point of contact that slides along said face 350 in response to the sliding rotation of the locking part 21 described below.

In a non-limiting embodiment shown in FIGS. 4 to 6, the main body 23 of the locking part 21 includes:
a main wall 39, and
two secondary walls 41A, 41B that are arranged on either side of the main wall 39.

The main wall 39 is designed to butt against the bearing plate 3, in particular against a side 32 of said bearing plate 3. In a non-limiting embodiment, the section of the main body 23 is substantially U-shaped or square in order to stiffen the whole of the locking part 21.

The secondary walls 41A, 41B are designed to frame the bearing plate 3. In a first non-limiting embodiment, the two secondary walls 41A, 41B of the main body 39 are parallel with one another. In a second non-limiting embodiment, these two secondary walls 41A, 41B converge such that the distance between these two secondary walls 41A, 41B level with the opening thereof is less than the distance measured at the point where these secondary walls 41A, 41B emerge from the main body 23, i.e. at the junction thereof with the main wall 39. In other words, the distance between these two secondary walls 41A, 41B at the opening thereof is less than the width of the main wall 39.

In one non-limiting embodiment, the two secondary walls 41A, 41B extend on either side of the main wall 39 such as to cover all or some of the bearing plate 3. The bearing plate 3 and the components thereof (light source 5, driver module 7, etc.) are thus well protected if the two secondary walls 41A, 41B cover the whole of the bearing plate 3.

In a non-limiting embodiment, the secondary walls 41A, 41B have beveled ends 43A, 43B. This facilitates the fitting of the bearing plate 3 into the locking part 21.

In one non-limiting embodiment shown in FIG. 6, the locking part 21 has two anchoring tabs 25A, 25B that are arranged to face one another in the main body 23. These two anchoring tabs 25A, 25B are designed to pass respectively through two apertures 29 in the reception casing 15. Only one aperture 29 is shown in the figures. The presence of two anchoring tabs 25A, 25B helps to better distribute the clearance O between the light guide 9 and the inside of the reception casing 15.

These anchoring tabs 25A, 25B are made of the same material as the main body 23 of the locking part 21, i.e. metal in the non-limiting example considered. The anchoring tabs project from the main body 23 to come into contact with the light guide 9 when the locking part 21 is in the locked position.

In a non-limiting embodiment, the anchoring tabs 25A, 25B are inclined in relation to the main body 23. As a result, the anchoring tabs move apart more easily when coming into contact with the light guide 9. This provides a spring effect that subsequently enables said light guide 9 to be clamped when the locking part 21 is in the locked position. In another non-limiting embodiment, the anchoring tabs can be perpendicular to the main body 23.

In a non-limiting embodiment, the anchoring tabs 25A, 25B are elastically deformable. The anchoring tabs can then fit the surface of the light guide 9 while exerting pressure on said light guide 9.

Furthermore, the anchoring tabs 25A, 25B include a projecting stop 27. The stop 27 projecting from the metal is used to anchor the anchoring tabs 25A, 25B in the surface of the light guide 9. The projecting stop 27 is in contact with the light guide 9 and slightly penetrates the surface of the light guide 9 such that the anchoring tabs 25A, 25B clamp said light guide 9 when the locking part 21 covers the reception casing 15. This makes it possible to clamp the light guide 9 such as to prevent the light guide 9 from being removed from the reception casing 15 (removal movements shown by the direction of the arrow 26). This enables the light guide 9 to be locked in the reception casing 15.

In a non-limiting embodiment, the main body 23 of the locking part 21 has an orifice 45 and said reception casing 15 has a locking stop 47 that is designed to fit into said orifice 45. This orifice 45 is arranged on the main body 23 opposite the support lug 33. The orifice 45 is designed to receive said locking stop 47 of the reception casing 15. The locking stop 47 thus enables the locking part 21 to be held on the reception casing 15 along the axis X, thereby enabling complete locking.

Assembly Method

The assembly method P for assembling the light guide 9 on the bearing plate 3 is shown in FIGS. 1 to 6.

In FIG. 1, the light guide 9 is inserted into the reception casing 15, as indicated by the arrow 16. The light guide 9 thus enters the reception casing 15 via the first opening 17. The light guide 9 is then slid along the reception casing 15 as far as the shoulder 37, as shown in FIG. 2. In this position, the light guide 9 is facing the light source 5, in particular the end 11 thereof. Thus, the light guide 9 can carry the light rays 4 emitted by the light source 5. In FIG. 3, a portion of the locking part 21 is inserted by means of a translational movement along the axis X into the reception casing 15 of said light guide 5. The locking part 21 is in the unlocked position. The light guide 9 can be removed from the reception casing 15.

In the position shown in FIG. 3:
the support lug 33 extending the main body 23 of the locking part 21 is positioned to face the arch bracket 35 such as to be partially inserted therein by a translational movement along the axis X of the locking part 21, as shown by the arrow 36,
the secondary walls 41A, 41B are placed on either side of the bearing plate 3. Once the support lug 33 has been inserted in the arch bracket 35, in FIG. 4, the locking part 21 is rotated towards the bearing plate 3, i.e. downwards as shown by the arrow 46 in FIG. 4.

Specifically, said locking part 21 rotates towards the bearing plate 3, which is said to be sliding since said rotation includes a rotation about the axis Z perpendicular to the bearing plate 3 (and therefore perpendicular to the axis X) combined with a slight translational movement along the axis X. In other words, the rotation of the locking part 21 is performed about the Z axis which is sliding along the X axis and perpendicular to the bearing plate 3. On completion of the sliding rotation, the main body of the locking part 21 butts against said bearing plate 3, in particular against one of the sides 32 thereof. As shown in FIG. 4, the support lug 33 is inserted into the arch bracket 35. Once inserted into the arch bracket 35, the support lug 33 acts as support for rotating the locking part 21 about the axis Z (which is sliding). During this rotation, the support lug 33 also performs a rotational movement about said axis Z such as to be fully inserted in the arch bracket 35.

During this rotation, the anchoring tabs 25A, 25B enter the aperture 29 of the reception casing 15 and clamp said light guide 9 such as to lock the light guide 9 in the reception casing 15 (as shown in FIG. 6). The locking part 21 is in the locked position shown in FIG. 4 or 6. The light guide 9 cannot be removed from the reception casing 15.

Finally, in FIG. 5, the light guide 9 is locked in the reception casing 15 by the locking stop 47 that fits into the orifice 45 of the locking part 21. The locking part 21 is in a locked position. The assembly comprising the locking part 21, reception casing 15 and bearing plate 3 are locked together. The longitudinal axis BB' of the locking part 21 is parallel with the portion of the light guide 9 positioned inside the reception casing 15.

Naturally, the description of the invention is not limited to the embodiments described above.

Thus, in another non-limiting embodiment, there are more than two anchoring tabs 25A, 25B.

Thus, in another non-limiting embodiment, the anchoring tabs 25A, 25B can be offset from one another to lock the light guide 9 at different places along the length of said light guide 9.

Thus, in another non-limiting embodiment, the light guide 9 need not be cylindrical. In this case, the inside of the reception casing 15 is not cylindrical and is adapted to the shape of the light guide 9.

Thus, in another non-limiting embodiment, the lighting module 5 is designed for a lighting device for a motor vehicle, said lighting device being designed to perform a given photometric function. In a non-limiting embodiment, such a lighting device is a front headlamp of a motor vehicle. In non-limiting embodiments, the photometric function is:
- a "high beam" photometric function for providing high beam, or
- a "low beam" photometric function for providing low beam, for example.

Thus, the invention described notably has the following advantages:
- simplified assembly of the light guide 9 in the reception casing 15,
- improved locking of the light guide 9 in the reception casing,
- improved manufacturing cost of the lighting module 9. The light guide 9 does not require matching shapes. A dedicated process for creating matching shapes is not required.

The invention claimed is:

1. A lighting module for a motor vehicle, said lighting module comprising:
    a bearing plate,
    a light source arranged on said bearing plate,
    a driver module for said light source arranged on said bearing plate,
    a light guide configured to cooperate with said light source,
    a reception casing for said light guide that is rigidly connected to said bearing plate,
    an arch bracket arranged on said bearing plate on an opposite side of the reception casing with respect to the light source, the arch bracket configured to support said locking part,
    said reception casing including:
        (i) a first opening that is configured to receive said light guide, and
        (ii) at least one aperture that is configured to receive an anchoring tab of a locking part,
    said locking part including:
        (a) a main body, and
        (b) at least one anchoring tab projecting from the main body that is configured to lock the light guide in said reception casing,
    wherein the light source, the driver module, and the reception casing are located on a same surface of the bearing plate.

2. The lighting module according to claim 1, wherein the reception casing has a second opening through which the light guide opens such as to face said light source.

3. The lighting module according to claim 1, wherein the locking part further includes a support lug that is configured to be inserted in said arch bracket.

4. The lighting module according to claim 1, wherein the reception casing further includes a shoulder configured to stop the light guide.

5. The lighting module according to claim 1, wherein the locking part includes two anchoring tabs that are arranged to face one another in the main body.

6. The lighting module according to claim 1, wherein said at least one anchoring tab is elastically deformable.

7. The lighting module according to claim 1, wherein the reception casing further includes a plurality of ribs.

8. The lighting module according to claim 1, wherein the bearing plate and the reception casing are made of a plastic material.

9. The lighting module according to claim 1, wherein the locking part is a metal part.

10. The lighting module according to claim 1, wherein the main body of the locking part includes:
    a main wall configured to butt against the bearing plate, and
    two secondary walls that are arranged on either side of the main wall and
    configured to frame said bearing plate.

11. The lighting module according to claim 10, wherein the two secondary walls of the main body are convergent.

12. The lighting module according to claim 10, wherein the two secondary walls extend on either side of the main wall such as to cover all or part of said bearing plate.

13. The lighting module according to claim 11, wherein the secondary walls have beveled ends.

14. The lighting module according to claim 1, wherein:
    said main body of said locking part includes an orifice, and
    said reception casing includes a locking stop configured to fit into said orifice.

15. The lighting module according to claim 2, wherein the reception casing further includes a shoulder configured to stop the light guide.

16. The lighting module according to claim 2, wherein the locking part includes two anchoring tabs that are arranged to face one another in the main body.

17. The lighting module according to claim 2, wherein said at least one anchoring tab is elastically deformable.

18. The lighting module according to claim 2, wherein the reception casing further includes a plurality of ribs.

19. The lighting module according to claim 1, wherein the light guide is in physical contact with the reception casing.

* * * * *